United States Patent Office 3,475,439
Patented Oct. 28, 1969

3,475,439
3-AZABICYCLO[3.3.1]NONANE COMPOUNDS
Issei Iwai, Eiji Ohki, Sadao Oida, and Hiromu Takagi, Tokyo, Japan, assignors to Sankyo Company Limited, Tokyo, Japan
No Drawing. Filed May 2, 1967, Ser. No. 635,355
Claims priority, application Japan, May 7, 1966, 41/28,800
Int. Cl. C07d 39/00; A61k 27/00
U.S. Cl. 260—294                    5 Claims

ABSTRACT OF THE DISCLOSURE

New analgesics 3 - methyl-9α-phenyl-9β-alkoxy-3-azabicyclo [3.3.1] nonanes and acid addition salts thereof. These azabicyclo [3.3.1] nonanes and acid addition salts are prepared by a process which comprises heating 3-methyl-9α-phenyl-9β-hydroxy-3-azabicyclo [3.3.1] nonane, the 9α-hydroxy isomer or a mixture thereof, in the presence of a mineral acid and a lower aliphatic alcohol, and, if desired, converting the free base so obtained to the corresponding acid addition salt in a manner known per se.

SUMMARY OF THE INVENTION

This invention relates to a new class of organic compounds and also to a process for the preparation of such organic compounds.

More particularly, it relates to a new group of 3-methyl-9α-phenyl-9β-alkoxy-3-azabicyclo[3.3.1]nonanes of the formula

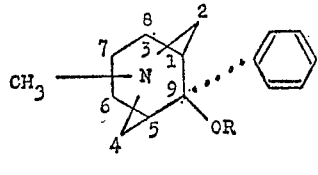

(I)

and acid addition salts thereof and also to a process for the preparation of said compounds and acid addition salts thereof.

In the above Formula I, the R is alkyl having from 1 to 3 carbon atoms, which may be illustratively represented by methyl, ethyl, n-propyl and isopropyl; the dotted line means a trans- or α-configuration and the solid line means a cis- or β-configuration.

Those 3-azabicyclo[3.3.1]nonanes (I) and acid addition salts of this invention are novel compounds and they are found to be valuable medicines, that is, useful new analgesic for relieving pain of various severity.

Those 3-azabicyclo[3.3.1]nonanes (I) and acid addinonane derivatives, i.e. those having the following formula (I)' or (I)" possess considerably high analgesic activity. (See U.S. Patent 3,167,562 issued to I. Iwai et al. on January 26, 1965 and British Patent 952,137 granted to I. Iwai et al. on June 29, 1964);

wherein R' is alkyl having from 1 to 4 carbon atoms, R" is hydrogen, a lower alkyl or a lower alkoxy and the dotted and solid lines are as defined above. However, these known 3-azabicyclo[3.3.1.]nonanes (I)' and (I)" have some serious disadvantages, the most import being their instability in storage over a long period of time, especially when they are in the form of a solution wherein these active compounds are very liable to degradation, thus the usefulness of these active compounds in medical practice is substantially reduced.

Unexpectedly, we have now found that a new group of the 3-azabicyclo[3.3.1]nonanes of the above Formula I and acid addition salts thereof have exceptionally high storage stability in the form of solutions, even in prolonged storage, and possess a substantially higher degree of analgesic activity, as compared to the aforesaid known 3 - azabicyclo[3.3.1]nonanes (I)', (I)"; and, therefore, these new 3-azabicyclo[3.3.1]nonanes and acid addition salts thereof are extremely valuable drugs for application in practice.

It is, accordingly, a principal object of this invention to provide a new group of the 3-azabicyclo[3.3.1]nonanes of the above Formula I and acid addition salts thereof which are useful as a stable and potent analgesic. Another object of this invention is to provide a process for the preparation of these valuable 3-azabicyclo[3.3.1]nonanes and acid addition salts thereof. Other objects will appear in the following description.

The 3-azabicyclo[3.3.1]nonanes (I) of this invention can be prepared in accordance with this invention by heating the 3-methyl-9β-phenyl-9α-hydroxy-3-azabicyclo [3.3.1]nonane having the following Formula II, the 3-methyl - 9α - phenyl - 9β - hydroxy-3-azabicyclo[3.3.1] nonane having the following Formula III, or a mixture thereof, in the presence of a mineral acid and an aliphatic alcohol having one to three carbon atoms.

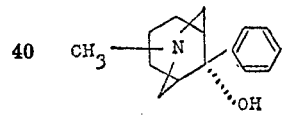 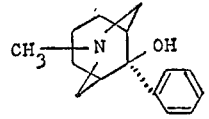

(II)                        (III)

In practising the process of this invention, the reaction may be preferably conducted as follows; the starting 3-azabicyclo[3.3.1]nonane of the above Formula II, that of the above Formula III or the mixture thereof is added to a mixture of a mineral acid and a aliphatic alcohol having one to three carbon atoms and the resulting mixture is then heated at approximately 100 to 160° C., preferably about 130–140° C., for about 1 to 5 hours. Suitable examples of the aliphatic alcohol to be employed in this invention include methanol, ethanol, n-propanol and isopropanol. Preferably, the reaction of this invention is conducted under pressure by a conventional means e.g. by employing a customarily used sealed tube, since the reaction period may be satisfactorily reduced there-

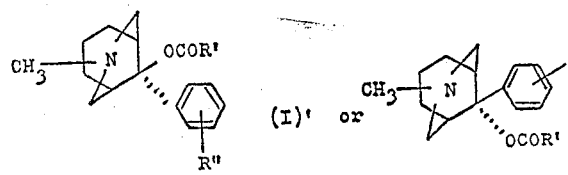

by. Examples of the mineral acid to be employed in this invention include hydrochloric acid, phosphoric acid, sulfuric acid and the like. The amount of the mineral acid to be used in carrying out the process of this invention generally may be at least one mole per mole of the starting material. No other solvents are required in this process, since the alcohol employed may serve both as a reagent and a solvent.

After completion of the reaction, the reaction product (free base) may be recovered from the reaction mixture by a conventional method, for example, by removing the alcohol by distillation under reduced pressure, making the residue alkaline with an alkaline substance e.g. conc. aqueous ammonia, extracting the alkaline mixture with a water-immiscible organic solvent, such as ether, and removing the solvent by distillation after washing and drying.

The free base (I) obtained as described above may be converted to the corresponding acid addition salt of this invention in a conventional manner, for example, by reacting the base with a mineral acid such as hydrochloric, hydrobromic, sulfuric or phosphoric acid or an organic acid such as tartaric or citric acid.

The active base (I) or acid addition salt of this invention may be administered as such, or in the form of a composition. When administered in the form of a composition, the active base (I) or acid addition salt of this invention may be compounded into any of those compositions for oral and parenteral administration commonly employed in the art. Parenteral compositions including injectable solutions and suspensions are preferable, but oral compositions including tablets, capsules, powders and oral suspensions may be conveniently employed as well. These compositions may be easily prepared from the active base or acid addition salt by a conventional technique known to those skilled in the art.

With reference to the dosage, the active base or acid addition salt of this invention may be generally administered for adults in a usual dose unit of about 10–50 mg. (as a free base) for adults at optional intervals as required. It will be easily understood that the dosage and interval may be varied and determined by those skilled in the art mainly depending upon the severity of pain and the response of a patient.

As an illustrative example, a formula of an injectable solution containing as an active ingredient the acid addition salt of this invention is given hereinbelow;

Component:
3-methyl-9α-phenyl-9β-methoxy - 3 - azabicyclo
  [3.3.1]nonane citrate _____ mg__ 25
Sodium chloride _____ mg__ 9
1 N sodium hydroxide _____ mg__ 0.09
Sterile distilled water for injection to make up
  to 1 ml.

The above formulation is thoroughly mixed and dissolved and then filled into a suitable ampoule for injection.

The following examples are given for the purpose of illustrating this invention, but these examples should not be construed to limit the scope thereof.

EXAMPLE 1

Preparation of 3-methyl-9α-phenyl-9β-n-propoxy-3-azabicyclo[3.3.1]nonane

A solution of 530 mg. of 3-methyl-9α-phenyl-9β-hydroxy-3-azabicyclo[3.3.1]nonane in 20 ml. of a 4% n-propanolic hydrochloric acid solution was heated under reflux for 4 hours. After cooling, the propanol was distilled off under reduced pressure, the residue was made alkaline by addition of conc. aqueous ammonia, and the alkaline mixture was extracted twice with a 30 ml. portion of ether. The combined ether extracts were washed with water, dried over anhydrous sodium sulfate, and the ether was distilled off to give 580 mg. of the desired product as a colorless oil.

I.R. spectrum:
  λmax. (liquid film); 2930, 1602, 1462, 1268, 1147, 1079[1], 1040, 1000, 975, 918, 831, 766, 755, 740, 700 cm.$^{-1}$.

[1] Strong absorption band based upon the presence of an ether band.

N.M.R. spectrum:
  N—$CH_3$; 2.23 p.p.m. (singlet),
  $CH_3CH_2CH_2O$; 0.78 p.p.m. (triplet J=6 c.p.s.),
  $CH_3CH_2CH_2O$; 2.83 p.p.m. (triplet J=6 c.p.s.),
  $C_6H_5$; 7.2–7.7 p.p.m. (multiplet).

The same procedure as described above was repeated, except that there was employed as a starting material an equl amount of 3-methyl-9β-phenyl-9α-hydroxy - 3 - azobicyclio [3.3.1]nonane; the same result as described above was obtained.

The corresponding citrate was prepared as follows: The free base (580 mg.) obtained as described above was dissolved in a suitable amount of ether. To the resulting solution was added 5 ml. of an ethanolic solution which contained citric acid at a concentration of 5 mg. per ml., thereby to separate a crystalline substance. After filtration, the crystalline substance so obtained was washed with ether and recrystallized from ethanol: ether yielding 650 mg. of the corresponding citrate as colorless microcrystals. M.P.: 148° C. (with decomposition).

*Analysis.*—Calculated for $C_{18}H_{27}NO \cdot C_6H_8O_7$; C, 61.92; H, 7.58; N, 3.01. Found: C, 61.52; H, 7.42; N, 3.21.

EXAMPLE 2

Preparation of 3-methyl-9α-phenyl-9β-ethoxy-3-azabicyclo[3.3.1]nonane

A solution of 500 mg. of 3-methyl-9β-phenyl-9α-hydroxy-3-azabicyclo [3.3.1] nonane in 20 ml. of a 4% ethanolic hydrochloric acid solution was heated at 140° C. for 2 hours in a sealed tube. Thereafter, the reaction mixture was treated in the same manner as in the above Example 1 to yield 450 mg. of the desired product as a colorless oil.

I.R. spectrum:
  λmax. (liquid film); 2940, 1602, 1269, 1149, 1072, 1029, 978, 919, 831, 800, 769, 742, 700 cm.$^{-1}$.

N.M.R. spectrum:
  N—$CH_3$; 2.22 p.p.m. (singlet),
  $CH_3CH_2O$; 0.92 p.p.m. (triplet J=7 c.p.s.),
  $CH_3CH_2O$; 2.92 p.p.m. (quartet J=7 c.p.s.),
  $C_6H_5$; 7.25–7.7 (p.p.m. multiplet).

The same procedure as described above was repeated except that there was employed as a starting material an equal amount of 3-methyl - 9α - phenyl-9β-hydroxy-3-azabicyclo [3.3.1] nonane: the same result as described above was obtained.

The corresponding citrate was prepared from the free base (450 mg.) obtained as described above in the same manner as in Example 1. Yield: 700 mg. (colorless microcrystals). M.P.: 151° C. (with decomposition).

*Analysis.*—Calculated for $C_{17}H_{25}NO \cdot C_6H_8O_7 \cdot \frac{1}{2}H_2O$; C, 59.98; H, 7.44; N, 3.04. Found: C, 60.29; H, 7.40; N, 3.10.

EXAMPLE 3

Preparation of 3-methyl-9α-phenyl-9β-methoxy-3-azabicyclo [3.3.1] nonane

A solution of 500 mg. of a mixture of 3-methyl-9α-phenyl-9β-hydroxy - 3 - azabicyclo [3.3.1] nonane and 3-methyl-9β-phenyl - 9α - hydroxy - 3 - azabicyclo [3.3.1] nonane (about 3:2) in 20 ml. of a 4% methanolic hydrochloric acid solution was heated at 140° C. for 2 hours in a sealed tube. Thereafter, the reaction mixture was treated in the same manner as in Example 1, except that recrystallization was carried out by utilizing methanol as a recrystallization solvent, thereby yielding 450 mg. of the desired product as leaflets melting at 73–74° C.

*Analysis.*—Calculated for $C_{16}H_{23}ON$: C, 78.32; H, 9.45; N, 5.71. Found: C, 78.38; H, 9.57; N, 5.54.

The same procedure as described above was repeated except that as a starting material an equal amount of 3-methyl-9α-phenyl - 9β - hydroxy - 3-azabicyclo [3.3.1] nonane or 3-methyl-9β-phenyl - 9α - hydroxy-3-azabicyclo [3.3.1] nonane. The same results as described above was obtained.

What is claimed is:
1. A compound of the formula

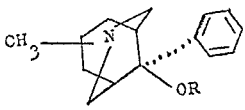

wherein R is alkyl having from 1 to 3 carbon atoms, the dotted line means a trans- or α-configuration of the phenyl group to the N atom and the solid line means a cis- or β-configuration of the alkoxy group to the N atom.

2. 3-methyl - 9α - phenyl - 9β - methoxy-3-azabicyclo [3.3.1] nonane.

3. 3-methyl - 9α - phenyl - 9β - ethoxy-3-azabicyclo [3.3.1] nonane.

4. 3-methyl - 9α - phenyl - 9β - methoxy-3-azabicyclo [3.3.1] nonane citrate.

5. An acid addition salt of the compound defined in claim 1, having the formula

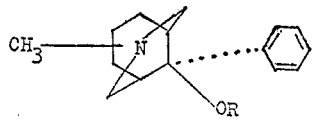

wherein R, the dotted line, and the solid line have the same meaning as in claim 1.

References Cited

Chem. & Pharm. Bull., vol. 14, No. 12, December 1966, Oida et al., pp. 1418–24.

Synthetic Organic Chemistry, Wagner and Zook, 1953, p. 231.

HENRY R. JILES, Primary Examiner

S. D. WINTERS, Assistant Examiner

U.S. Cl. X.R.

260—294.7; 424—267